(12) United States Patent
Kaufmann et al.

(10) Patent No.: US 10,402,145 B2
(45) Date of Patent: Sep. 3, 2019

(54) OPTOELECTRONIC LIGHTING DEVICE, VIDEO WALL MODULE AND SIGNAL TRANSMITTER FOR A LIGHT SIGNALING INSTALLATION

(71) Applicant: OSRAM Opto Semiconductors GmbH, Regensburg (DE)

(72) Inventors: Nils Kaufmann, Regensburg (DE); Peter Brick, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 10 days.

(21) Appl. No.: 15/597,210

(22) Filed: May 17, 2017

(65) Prior Publication Data

US 2017/0337031 A1 Nov. 23, 2017

(30) Foreign Application Priority Data

May 17, 2016 (DE) .................. 10 2016 109 050

(51) Int. Cl.

| G06F 3/14 | (2006.01) |
|---|---|
| F21V 15/01 | (2006.01) |
| G09F 9/33 | (2006.01) |
| F21V 31/00 | (2006.01) |
| F21Y 115/10 | (2016.01) |
| H04N 9/12 | (2006.01) |

(52) U.S. Cl.
CPC ............ *G06F 3/1446* (2013.01); *F21V 15/01* (2013.01); *F21V 31/00* (2013.01); *G09F 9/33* (2013.01); *F21Y 2115/10* (2016.08); *H04N 9/12* (2013.01)

(58) Field of Classification Search
CPC .............................. G06F 3/1446; F21V 15/01
USPC ............................................................ 257/99
See application file for complete search history.

(56) References Cited

U.S. PATENT DOCUMENTS

| 6,762,553 B1* | 7/2004 | Yokogawa | H01L 51/5262 313/483 |
|---|---|---|---|
| 2002/0054252 A1* | 5/2002 | Ishii | G02B 5/201 349/106 |
| 2003/0116719 A1* | 6/2003 | Miyazawa | H01L 51/5262 250/484.2 |
| 2004/0012980 A1* | 1/2004 | Sugiura | H01L 51/5262 362/560 |
| 2004/0178724 A1* | 9/2004 | Karasawa | H01L 51/5281 313/506 |

(Continued)

FOREIGN PATENT DOCUMENTS

| EP | 2 378 575 A1 | 10/2011 |
|---|---|---|
| JP | 2008-098217 A | 4/2008 |

OTHER PUBLICATIONS

German Search Report dated Jan. 25, 2017 in corresponding German Application No. 10 2016 109 050.6.

*Primary Examiner* — Igwe U Anya
(74) *Attorney, Agent, or Firm* — DLA Piper LLP (US)

(57) ABSTRACT

An optoelectronic lighting device includes a carrier, a plurality of light-emitting optoelectronic components arranged on an upper side of the carrier, and at least one layer of a hydrophobic aerogel that protects the plurality of light-emitting optoelectronic components from influences of moisture. A video wall module includes the optoelectronic light device. A signal transmitter for a light signaling installation includes the optoelectronic light device.

20 Claims, 4 Drawing Sheets

(56) References Cited

U.S. PATENT DOCUMENTS

| | | | |
|---|---|---|---|
| 2004/0233271 A1* | 11/2004 | Nojima | B41J 2/451 |
| | | | 347/238 |
| 2006/0198209 A1* | 9/2006 | Tran | B82Y 10/00 |
| | | | 365/189.05 |
| 2008/0117362 A1* | 5/2008 | Wolk | G02F 1/133603 |
| | | | 349/69 |
| 2011/0284494 A1* | 11/2011 | Von Malm | H01L 51/5036 |
| | | | 216/13 |
| 2012/0112223 A1 | 5/2012 | Kuo | |
| 2014/0291658 A1* | 10/2014 | Muller | H01L 51/5253 |
| | | | 257/40 |
| 2014/0367633 A1 | 12/2014 | Bibl et al. | |

* cited by examiner

OPTOELECTRONIC LIGHTING DEVICE, VIDEO WALL MODULE AND SIGNAL TRANSMITTER FOR A LIGHT SIGNALING INSTALLATION

TECHNICAL FIELD

This disclosure relates to an optoelectronic lighting device, a video wall module and a signal transmitter for a light signaling installation.

BACKGROUND

In indoor and outdoor applications of LED systems, instances of contamination can occur as a result of water-containing, contaminated drops that attach themselves, for example, rain, accompanied by particles.

There is therefore a need to protect LED systems from moisture, in particular from water and contamination implicated by water.

It could therefore be helpful to provide a means that makes efficient protection from influences of moisture possible for a plurality of light-emitting optoelectronic components.

SUMMARY

We provide an optoelectronic light device including a carrier, a plurality of light-emitting optoelectronic components arranged on an upper side of the carrier, and at least one layer of a hydrophobic aerogel that protects the plurality of light-emitting optoelectronic components from influences of moisture.

We also provide a video wall module including the optoelectronic lighting device including a carrier, a plurality of light-emitting optoelectronic components arranged on an upper side of the carrier, and at least one layer of a hydrophobic aerogel that protects the plurality of light-emitting optoelectronic components from influences of moisture.

We further provide a signal transmitter for a light signaling installation including the optoelectronic lighting device including a carrier, a plurality of light-emitting optoelectronic components arranged on an upper side of the carrier, and at least one layer of a hydrophobic aerogel that protects the plurality of light-emitting optoelectronic components from influences of moisture.

Figure 1:
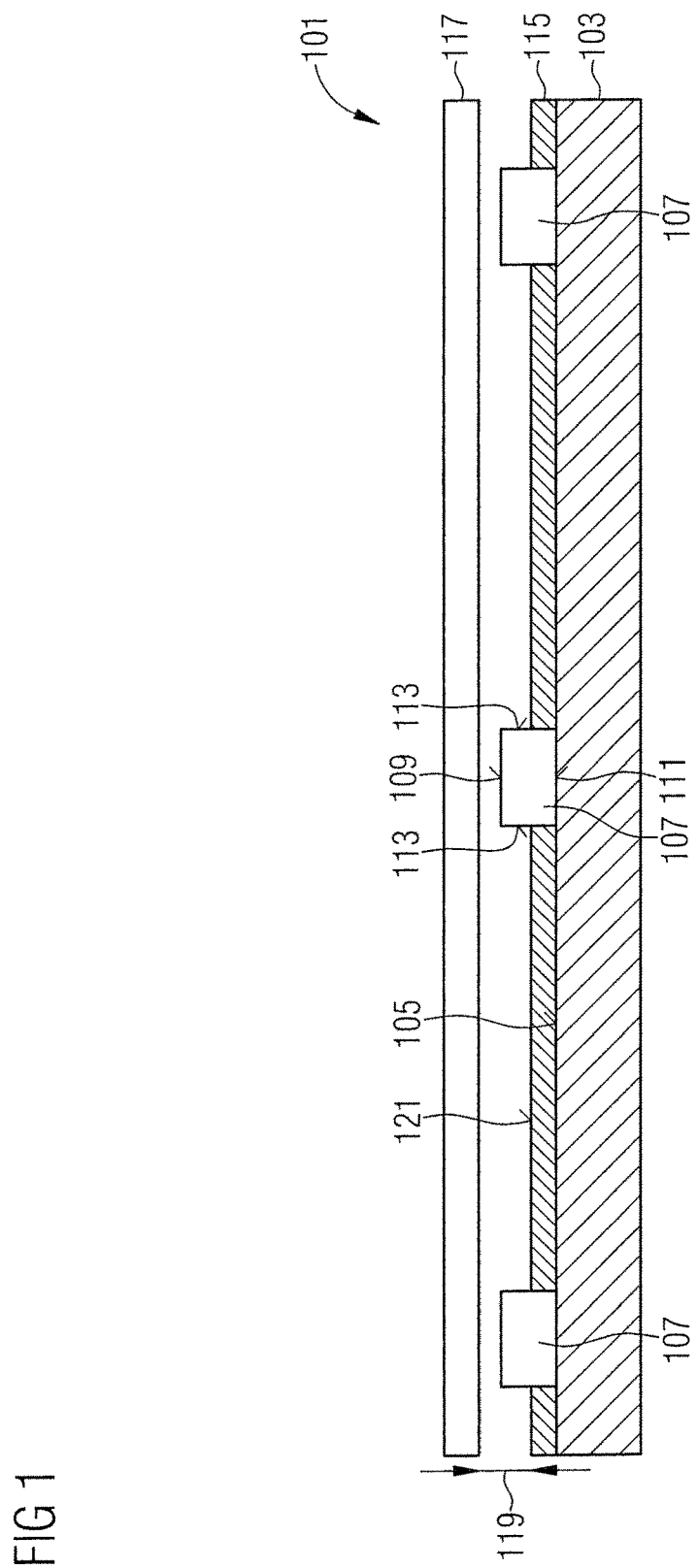
FIG. 1 shows a first optoelectronic light device.

LIST OF DESIGNATIONS 101 first optoelectronic lighting device
103 carrier
105 upper side of the carrier
107 light-emitting diode chip
109 upper side of the light-emitting diode chip
111 underside of the light-emitting diode chip
113 side flank of the light-emitting diode chip
115 black covering layer
117 layer of hydrophobic aerogel
119 distance
121 upper side of the black covering layer
200 light-emitting diode chip carrier
203 upper side of the light-emitting diode chip carrier
205 spacer
301 second optoelectronic lighting device
401 video wall module
403 third optoelectronic lighting device
501 signal transmitter for a light signaling installation
503 fourth optoelectronic lighting device
601 fifth optoelectronic lighting device

DETAILED DESCRIPTION

We provide an optoelectronic lighting device comprising:
a carrier,
a plurality of light-emitting optoelectronic components arranged on an upper side of the carrier, and
at least one layer of a hydrophobic aerogel to protect the plurality of light-emitting optoelectronic components from influences of moisture.

We also provide a video wall module comprising the optoelectronic lighting device.

We further provide a signal transmitter for a light signaling installation, the signal transmitter comprising the optoelectronic lighting device.

We found that a plurality of light-emitting optoelectronic components can be protected by a layer of a hydrophobic aerogel. The fact that the aerogel takes the form of a hydrophobic aerogel means in particular that a technical advantage is obtained that liquid drops, for example, water drops can scarcely attach themselves to the layer or cannot attach themselves. Rather, the technical effect is obtained that the liquid drops can efficiently roll off from a surface of the layer. That is to say in particular that liquid drops, for example, water drops can roll off from the layer of a hydrophobic aerogel. Particles of dirt lying on the layer can in this way be efficiently flushed away. This effect is, for example, also known by the name "lotus effect."

An aerogel also has an optical refractive index that lies in the range of the optical refractive index of air. This advantageously allows the avoidance of undesired refractions at the transition between air and the aerogel.

If a material having a refractive index that differs significantly from the refractive index of air were used for the layer, an interface with reflections would be created by this refractive index, with the potential effect not only of reducing the efficiency of the light-emitting optoelectronic components, but also creating what is known as a "halo" around a light-emitting optoelectronic component. In particular for a video wall module, this enlargement (halo) of the emission face can increase the pixel size and/or possibly lead to a lack of sharpness, which is generally undesired. Undesired reflections caused by an external light may likewise occur in a protective layer of glass if, for example, an external light, for example, sunlight is reflected at the protective layer of glass, which may be formed as a pane of glass, that is to say if, for example, the sun is reflected from the pane of glass.

The use of a hydrophobic aerogel for the layer brings about the effect in particular of efficient protection of the plurality of light-emitting diode chips without reflection-related interfaces occurring.

This brings about the technical advantage in particular that an enlargement of the emission face can be avoided. In particular, it results in the technical advantage that a pixel size is not increased as a result of an enlargement of the emission face. In particular, losses in sharpness can thereby be avoided. This is particularly relevant for applications with a high pixel density. A high pixel density means that a distance between two pixels is smaller than twice a length of a light-emitting face of the component.

Also brought about as a result is the technical advantage that undesired reflections of external light sources (that is to say light sources that lie outside the emitting system) can be reduced, and in particular avoided.

This therefore brings about the technical advantage of providing a means that makes efficient protection from influences of moisture possible for a plurality of light-emitting optoelectronic components.

An aerogel is a solid of which, for example, up to 99.98% of the volume is formed by pores. The solid may consequently be referred to, for example, as a highly porous solid. A maximum pore size is, for example, smaller than 420 nm, in particular smaller than 400 nm, preferably smaller than 380 nm.

An aerogel comprises a dendritic structure, that is to say a branching of particle chains with a plurality of interspaces in the form of open pores. These particle chains have contact points so that the particle chains form a stable, sponge-like network. The maximum pore size or particle size preferably lies in the range from 380 nm to 420 nm.

The respective pore size of the pores is, for example, smaller than 400 nm, for example, smaller than 200 nm, for example, smaller than 100 nm. This brings about the technical advantage, for example, that a scattering cross section and a scattering efficiency of the pores can be reduced effectively and efficiently.

A respective particle size of the particles of the particle chains is, for example, smaller than 400 nm, for example, smaller than 200 nm, for example, smaller than 100 nm. This brings about the technical advantage, for example, that a scattering cross section and a scattering efficiency of the particles can be reduced effectively and efficiently.

The ranges given above by way of example for pore sizes and/or particle sizes are in particular independent of the aerogel that is specifically used.

An aerogel is referred to as hydrophobic if a contact angle of a liquid drop, in particular a water drop, with a surface of the layer of the aerogel is at least 90° or more than 90°. The contact angle refers to the angle that a liquid drop on the surface of the layer forms with this surface.

In a contact angle of, for example, greater than or greater than or equal to 160°, the aerogel may also be referred to as a superhydrophobic aerogel. That is to say therefore that, according to one example, the aerogel is a superhydrophobic aerogel. Consequently, the feature "hydrophobic" comprises the feature "superhydrophobic."

In one example, a hydrophobic aerogel comprises silica with a plurality of alkoxy groups. Such alkoxy groups are comprised in particular of aerogels produced by a supercritical alcohol in the course of a drying process.

In one example, a light-emitting optoelectronic component is a light-emitting diode (LED) or a light-emitting diode chip (LED chip). The plurality of light-emitting optoelectronic components are, for example, configured identically or, for example, configured differently. For example, the plurality of components comprise both LED chips and LEDs.

The at least one layer of aerogel may at least partially be arranged directly on the plurality of light-emitting optoelectronic components.

This brings about the technical advantage in particular that efficient protection for the light-emitting optoelectronic components can be achieved.

For example, the plurality of light-emitting optoelectronic components are embedded in the layer of aerogel.

This brings about the technical advantage in particular that efficient protection for the light-emitting optoelectronic components can be achieved.

It is possible that the at least one layer of aerogel is at least partially spaced apart from the plurality of light-emitting optoelectronic components.

This brings about the technical effect in particular that an increased flexibility during the construction of the optoelectronic lighting device can be achieved. Furthermore, air or a vacuum can be used, for example, as a low-cost insulator between the layer of aerogel and the components.

Furthermore, an optical element (or, for example, a plurality of optical elements) can be provided in an advantageous way between the layer of aerogel and the light-emitting optoelectronic components if the layer is arranged spaced apart from the components. Such an optical element is, for example, a lens.

Advantageous ventilation of the aerogel layer and the other components can also be realized with simultaneous protection from water and particles. As a result, organic substances possibly present or penetrate from the surroundings, and when irradiated with blue light may change and bring about adverse properties in the system or one of the components of the system, could be reduced by the ventilation; and in particular the average dwell time, and consequently a possible adverse effect, can be avoided as a result. Such substances are referred to as "volatile organic compounds (VOC)." Such substances may, for example, outgas from an adhesive by which the components are stuck on the upper side of the carrier.

Some of the light-emitting optoelectronic components may be provided with a layer of aerogel in each case. For example, some of the light-emitting optoelectronic components are provided with a spaced-apart layer of aerogel. That is to say therefore that in one example, some of the light-emitting optoelectronic components are embedded in a layer of aerogel, whereas according to this one example other light-emitting optoelectronic components are protected by a spaced-apart layer of aerogel.

At least one spacer that projects above the plurality of light-emitting optoelectronic components and on which the at least one layer of aerogel lies may be arranged on the upper side of the carrier.

This brings about the technical advantage in particular that a certain spacing between the layer of aerogel and the components can be efficiently predetermined by way of the spacer. In particular, this brings about the technical advantage that the layer of aerogel can be arranged efficiently.

Each light-emitting optoelectronic component may be assigned a layer of a hydrophobic aerogel of its own. In particular, only some of the light-emitting optoelectronic components are assigned a layer of a hydrophobic aerogel of their own.

The refractive index of the at least one layer of aerogel may be smaller than or smaller than or equal to 1.1.

This brings about the technical advantage in particular that undesired refractions or reflections at the transition between the air and the aerogel can be efficiently avoided.

The at least one layer of aerogel may have a transmission of at least 90%, in particular at least 95%, for a wavelength of electromagnetic radiation emitted by the plurality of light-emitting optoelectronic components.

This brings about the technical advantage in particular that the emitted electromagnetic radiation can be efficiently coupled out.

If a plurality of layers of a hydrophobic aerogel are provided, they are, for example, configured identically or, for example, configured differently.

A black covering layer may be arranged on the upper side of the carrier in each case between the plurality of light-emitting optoelectronic components.

This brings about the technical advantage in particular that a contrast of the optoelectronic lighting device can be increased efficiently. This is particularly advantageous in particular if the optoelectronic lighting device is used in a video wall module or in a signal transmitter for a light signaling installation.

The black covering layer may be protected from influences of moisture by the at least one layer of aerogel.

This brings about the technical advantage in particular that the covering layer is protected efficiently from influences of moisture.

The black covering layer may be embedded in the layer of aerogel.

This brings about the technical advantage in particular that the covering layer is protected efficiently from influences of moisture.

The layer of aerogel may be arranged spaced apart from the black covering layer.

The black covering layer is, for example, configured as a silicon layer in which black particles, for example, carbon black particles, are embedded.

The at least one layer of aerogel may be configured as an outermost covering layer for the plurality of light-emitting optoelectronic components.

This brings about the technical advantage in particular that the layer of aerogel can protect the further elements of the optoelectronic lighting device efficiently from influences of moisture. As a result, such a layer of aerogel can, for example, efficiently protect one or more lenses.

In particular, such a layer of aerogel can then protect the further elements of the optoelectronic lighting device efficiently from mechanical influences, in particular instances of mechanical damage.

Video wall modules must generally undergo what is known as a "hogbrush test." Without additional protection, lenses or the light-emitting optoelectronic components would not reliably withstand the mechanical loading produced by the hogbrush test. Provision of an outermost covering layer that takes the form of a layer of aerogel consequently brings about the technical advantage in particular that the hogbrush test can be efficiently passed.

In the video wall industry, the "hogbrush test" is a test for video walls comprising a treatment of the video wall with a hogshair brush, it being required for the video wall to pass the "hogbrush test" without significant impairment of the optical properties.

If, for example, the plurality of light-emitting optoelectronic components are each electrically contacted by a bonding wire or by a plurality of bonding wires, a layer of aerogel brings about efficient protection for the bonding wires from mechanical loads in an advantageous way.

For example, according to one example, the optoelectronic lighting device is integrated in a stage lighting system.

The plurality of light-emitting optoelectronic components may be configured identically.

The plurality of light-emitting optoelectronic components may be configured differently.

The plurality of light-emitting optoelectronic components may comprise one or more light-emitting optoelectronic components configured to emit red light.

The plurality of light-emitting optoelectronic components may comprise one or more light-emitting optoelectronic components configured to emit blue light.

The plurality of light-emitting optoelectronic components may comprise one or more light-emitting optoelectronic components configured to emit green light.

If, therefore, red-light-emitting, green-light-emitting and blue-light-emitting light-emitting optoelectronic components are provided, a specific color within the RGB color space can be set by way of corresponding color mixing.

At least one of the plurality of light-emitting optoelectronic components, for example, all of the plurality of light-emitting optoelectronic components, may be individually activatable.

The carrier may be configured as a circuit board. A circuit board is also referred to as a "printed circuit board."

Provision of a circuit board makes efficient electrical contacting and activation of the light-emitting optoelectronic components possible.

An aerogel is, for example, a silicate ("silica") aerogel and may, for example, have the following chemical composition: SiO(OH)y(OR)z, with y and z as parameters dependent on the preparation process. A silicate aerogel has, for example, a high optical transparency. A silicate aerogel has, for example, a refractive index of, for example, 1.007 to 1.24; for example, the refractive index is 1.02.

Individual particles of a silicate aerogel are, for example, 1 nm to 10 nm in size. A distance between particle chains is, for example, 10 nm to 100 nm. The pores of a silicate aerogel, with the pores being cylindrical, for example, and it being possible, for example, for the pores also to be referred to as mesopores, in particular as cylindrical mesopores, have, for example, in each case a diameter of, for example, 2 nm to 50 nm, a porosity lying, for example, in the range from 80% to 99.8%. An apparent density consequently lies, for example, in the range from $$0.16 \frac{mg}{cm^3}$$

(aerographene) to $$500 \frac{mg}{cm^3},$$

with a typical value by way of $$100 \frac{mg}{cm^3},$$

whereas the true density lies, for example, between $$1700 \frac{mg}{cm^3} \text{ and } 2100 \frac{mg}{cm^3}.$$

The expression "or respectively" comprises in particular the expression "and/or."

The properties, features and advantages of this disclosure described above and the manner in which they are achieved become clearer and more clearly understandable in connection with the following description of the examples explained in greater detail in connection with the drawings.

In the text that follows, the same references are used for the same features.

In the following examples, the light-emitting optoelectronic components are each configured as a light-emitting diode chip. This is not restrictive. In the following statements, therefore, the more general term "light-emitting optoelectronic component" is always to be inferred when the term "light-emitting diode chip" is used. Thus, for example, light-emitting diodes may be provided instead of or in addition to the light-emitting diode chips as light-emitting optoelectronic components.

FIG. 1 shows a first optoelectronic lighting device 101 in a schematically represented cross-sectional view.

The lighting device 101 comprises a carrier 103. The carrier 103 is, for example, a circuit board.

The carrier 103 has an upper side 105. A plurality of light-emitting diode chips 107 are arranged on the upper side 105. The plurality of light-emitting diode chips 107 each have an upper side 109 and an underside 111 opposite from the upper side 109. Furthermore, the light-emitting diode chips 107 each have opposite side flanks 113. The light-emitting diode chips 107 each have are arranged with their underside 111 on the upper side 105 of the carrier 103.

That is to say therefore that the underside 111 of the light-emitting diode chips 107 faces the upper side 105 of the carrier 103.

The lighting device 101 also comprises a black covering layer 115. The black covering layer 115 is arranged on the upper side 105 of the carrier 103 between the light-emitting diode chips 107. That is to say therefore that a black covering layer is provided between the light-emitting diode chips 107. The black covering layer 115 is, for example, formed from a silicone comprising black carbon black particles or for example from an epoxy comprising black carbon black particles.

The black covering layer 115 is in direct contact with the side flanks 113 of the light-emitting diode chips 107. That is to say therefore that the black covering layer 115 runs from a side flank 113 of one of the light-emitting diode chips 107 to a side flank 113 of a further of the light-emitting diode chips 107 opposite from this side flank 113.

Provision of the black covering layer 115 has the effect of efficiently increasing a contrast of the lighting device 101 in an advantageous way. As an alternative to a black covering layer, in one example, a blackened carrier is provided, therein the upper side of the carrier on which the light-emitting optoelectronic components are located is blackened in particular.

The lighting device 101 also comprises a layer 117 of a hydrophobic aerogel. The provision of the layer 117 of a hydrophobic aerogel advantageously brings about the effect that the plurality of light-emitting diode chips 107 can be protected from influences of moisture.

The layer 117 is arranged spaced apart from the upper side 109 of the light-emitting diode chips 107. That is to say therefore that the layer 117 is also arranged spaced apart from the black covering layer 115. This is symbolically indicated by a double-headed arrow with the designation 119, which is consequently to this extent intended to indicate a distance between the layer 117 and the covering layer 115.

The fact that the layer 117 is arranged spaced apart from the light-emitting diode chips 107 means that flexibility during a construction or assembly of the lighting device 101 is brought about in an advantageous way. In particular, it advantageously results in the technical effect that an easy exchange of one or more of the light-emitting diode chips 107 is efficiently made possible. That is to say therefore that, according to this example, a spatial separation of the layer 117 and the further elements of the lighting device 101 is provided. That is to say therefore that a spatial separation between the optically neutral protection, here the layer 117, and the further elements, here in particular the light-emitting diode chips 107, is provided.

Such a spatial separation also advantageously brings about an increase in degrees of freedom of design.

The layer 117 may be configured as a film.

The layer 117 may also be configured as a sheet.

The layer 117 is dimensioned in its size such that the layer 117 covers at least the entire upper side 105 of the carrier 103. That is to say therefore in particular that all of the further elements of the lighting device are efficiently protected by the layer 117.

In an example not shown, the first optoelectronic lighting device 101 is comprised of a video wall module.

In an example not shown, the first optoelectronic lighting device 101 is comprised of a signal transmitter for a light signaling installation.

The spaced-apart arrangement of the layer 117 shown in FIG. 1 is realized according to one example by one or more spacers arranged on the upper side 105 of the carrier 103 or, respectively, on an upper side 121 of the black covering layer 115 facing away from the upper side 105 of the carrier 103.

The spacers have a length dimensioned such that the spacers project above the upper side 109 of the light-emitting diode chips 107.

Figure 2:
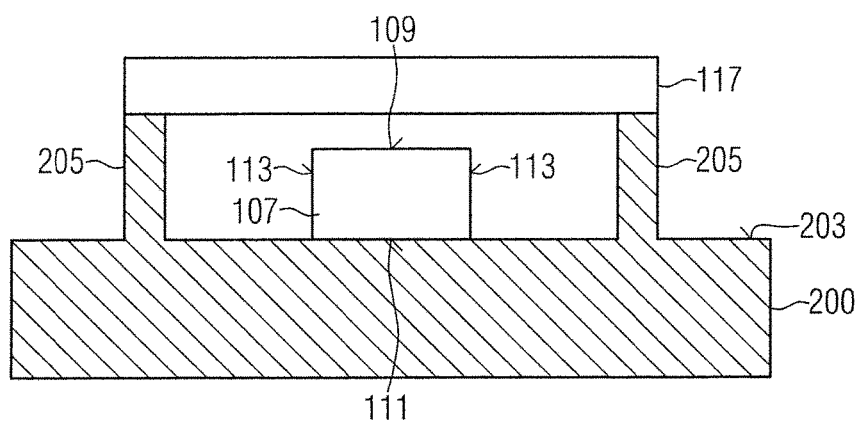
FIG. 2 shows a light-emitting-diode chip carrier with a light-emitting diode chip.

FIG. 2 shows a light-emitting diode chip carrier 200 in a cross-sectional view represented in a simplified form.

The light-emitting diode chip carrier 200 has an upper side 203. The light-emitting diode chip 107 is arranged on the upper side 203. The light-emitting diode chip 107 is arranged with its underside 111 on the upper side 203 of the light-emitting diode chip carrier 200. Lying opposite the side flanks 113 of the light-emitting diode chip 107 there is in each case a spacer 205 arranged on the upper side 203 of the light-emitting diode chip carrier 200. The two spacers 205 have a rectangular form. The two spacers 205 are, for example, configured as a web.

That is to say therefore that a spacer 205 is provided in each case on the left and right of the light-emitting diode chip 107 with respect to the plane of the paper. The height of the spacers 205 with respect to the upper side 203 of the light-emitting diode chip carrier 200 is greater than the height of the light-emitting diode chip 107 with respect to the upper side 203 of the light-emitting diode chip carrier 200.

That is to say therefore that the two spacers 205 project above the light-emitting diode chip 107.

The term "light-emitting diode chip carrier" may also be replaced by the term "component carrier" to clarify that such a carrier can carry not just exclusively light-emitting diode chips, but generally light-emitting optoelectronic components, for example, LEDs.

A layer 117 of hydrophobic aerogel is arranged on the two spacers 205. That is to say therefore that a layer 117 of hydrophobic aerogel lies on the two spacers 205. The fact that the two spacers 205 project above the light-emitting diode chip 107 means that the layer 117 is arranged spaced apart from the upper side 109 of the light-emitting diode chip 107. That is to say therefore that the layer 117 is arranged spaced apart from the light-emitting diode chip 107.

The arrangement shown in FIG. 2 may be used for an optoelectronic lighting device. According to this example, which is not shown here, it is provided that a plurality of such light-emitting diode chip carriers 200 (or generally component carriers) are arranged on an upper side 105 of a carrier 103. That is to say therefore that, according to such an example of an optoelectronic lighting device, each light-emitting diode chip is provided with a layer of hydrophobic aerogel of its own.

In an example not shown, it is provided, for example, in the first optoelectronic lighting device 101 that, by analogy with the arrangement shown in FIG. 2, a spacer 205 is provided in each case to the left and right of the light-emitting diode chips 107 with respect to the plane of the paper. In this example, the layer 117 of hydrophobic aerogel of the first optoelectronic lighting device 101 is then placed on the plurality of spacers 205. That is to say therefore that, in such an example, the plurality of light-emitting diode chips 107 are assigned a common layer, here the layer 117.

Figure 3:
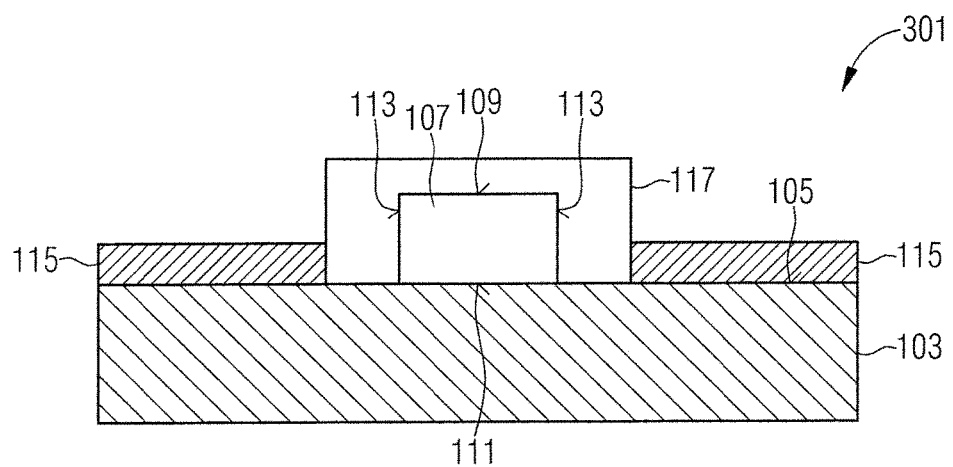
FIG. 3 shows a second optoelectronic light device.

FIG. 3 shows a second optoelectronic lighting device 301 in a schematically represented cross-sectional view. In the second optoelectronic lighting device 301, the light-emitting diode chips 107 are each embedded in a layer 117 of hydrophobic aerogel. For the sake of overall clarity, only one light-emitting diode chip 107 is shown embedded in a layer 117 of hydrophobic aerogel in FIG. 3. Nevertheless, the second optoelectronic lighting device 301 has a plurality of light-emitting diode chips 107, which by analogy with the light-emitting diode chip 107 shown are embedded in a layer 117 of hydrophobic aerogel of their own.

That is to say therefore that, in the second optoelectronic lighting device 301, the respective layer 117 of hydrophobic aerogel is in direct contact with the side flanks 113 and the upper side 109 of the light-emitting diode chips 107. That is to say therefore that the black covering layer 115 is no longer in direct contact with the side flanks 113 of the light-emitting diode chips 107, but in direct contact with the respective layer 117 of hydrophobic aerogel.

Figure 4:
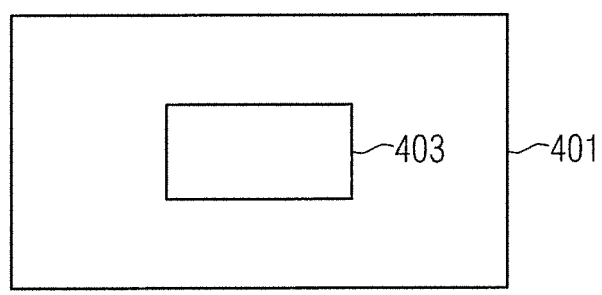
FIG. 4 shows a video wall module with a third optoelectronic lighting device.

FIG. 4 symbolically shows in a schematically simplified representation a video wall module 401 comprising a third optoelectronic lighting device 403 configured according to an example described in this description. For example, the third optoelectronic lighting device 403 is configured by analogy with the first lighting device 101 or by analogy with the second lighting device 301.

Figure 5:
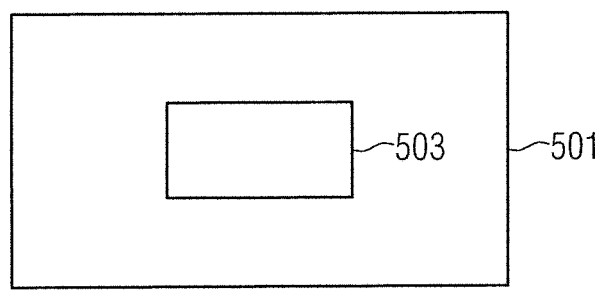
FIG. 5 shows a signal transmitter for a light signaling installation with a fourth optoelectronic lighting device.

FIG. 5 symbolically shows in a schematically simplified representation a signal transmitter 501 for a light signaling installation, the signal transmitter 501 comprising a fourth optoelectronic lighting device 503 configured according to an example described in this description. For example, the fourth optoelectronic lighting device 503 is configured by analogy with the first optoelectronic lighting device 101 or by analogy with the second optoelectronic lighting device 301.

Figure 6:
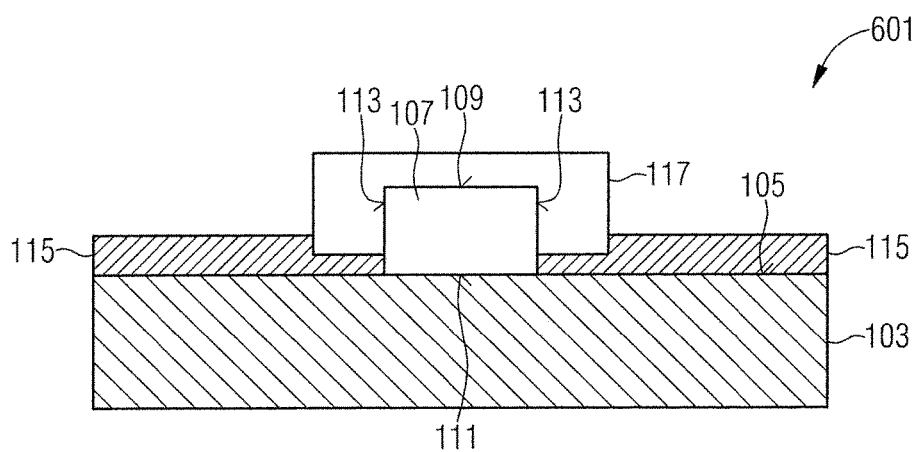
FIG. 6 shows a fifth optoelectronic lighting device.

FIG. 6 shows a fifth optoelectronic lighting device 601 in a schematically represented cross-sectional view. In the fifth optoelectronic lighting device 601, the light-emitting diode chips 107 are each partially embedded in a layer 117 of hydrophobic aerogel. For the sake of overall clarity, only one light-emitting diode chip 107 is shown partially embedded in a layer 117 of hydrophobic aerogel in FIG. 6. Nevertheless, the fifth optoelectronic lighting device 601 has a plurality of light-emitting diode chips 107, which by analogy with the light-emitting diode chip 107 shown are partially embedded in a layer 117 of hydrophobic aerogel of their own.

That is to say therefore that, in the fifth optoelectronic lighting device 601, the respective layer 117 of hydrophobic aerogel is in direct contact with the side flanks 113 and the upper side 109 of the light-emitting diode chips 107, but does not completely cover the side flanks 113. The black covering layer 115 touches the side flanks 113 wherever the layer 117 does not contact or touch the side flanks 113. Portions of the covering layer 115 located under the layer 117 have a smaller thickness than portions of the covering layer 115 not located under the layer 117. The layer 117 of the fifth optoelectronic lighting device 601 is therefore also arranged on the covering layer 115.

In an example not shown, portions of the covering layer 115 located under the layer 117 have a thickness the same as portions of the covering layer 115 not located under the layer 117.

A thickness of the covering layer 115 is in this case always smaller than a height of the light-emitting diode chips 117 with respect to the upper side 105 of the carrier 103 so that the light-emitting diode chips 107 are at least partially, in particular completely, embedded in the layer 117 of hydrophobic aerogel.

To sum up, we provide, for example, the use of a hydrophobic transparent protective layer having a refractive index very close to that of air: the layer of hydrophobic aerogel. The expression "very close to that of air" refers in particular to a refractive index that lies in the range of 1.002 to 1.24, in particular 1.007 to 1.1.

As a result, further elements of the lighting device can be efficiently protected from moisture in an advantageous way, for example, from water or from rain, accompanied by particles, without reflection-related interfaces occurring. The layer of an optically transparent hydrophobic aerogel is therefore such a protective layer. The further components of the aerogel, for example, the material and/or a particle size and/or pore size, are chosen in particular such that the layer is transparent in a wavelength range of the electromagnetic radiation emitted by the light-emitting diode chips. In particular, the components of the aerogel are chosen such that there is no diffuse scattering, for example, Rayleigh scattering of optical wavelengths, that is to say electromagnetic radiation in a wavelength range visible to the human eye. The particles and pores relevant to the scattering are in particular smaller than the wavelength of the light still visible to the human eye, that is to say generally smaller than 420 nm, in particular smaller than 400 nm, for example, smaller than 380 mm depending on the specific human eye.

Aerogels are highly porous solids up to 99.98% of the volume of which consists of pores. A maximum pore size is, for example, smaller than 420 nm, in particular smaller than 400 nm, preferably smaller than 380 nm.

Aerogels have a highly dendritic structure, that is to say a branching of particle chains with very many interspaces in the form of open pores. These chains have contact points so that ultimately the pattern of a stable, sponge-like network is obtained. The maximum pore size preferably is 380 nm to 420 nm.

An aerogel is, for example, a silicate ("silica") aerogel and may, for example, have the following chemical composition: $SiO(OH)y(OR)z$, with y and z as parameters that are dependent on the preparation process. The silicate aerogels have a high optical transparency and have a refractive index of for instance 1.007 to 1.24, with a typical value of 1.02.

The individual particles of the silicate aerogels are around one to ten nanometers in size and the distance between the chains is for instance 10 to 100 nm. The cylindrical mesopores have a diameter of 2 nm to 50 nm, the porosity lying, for example, in the range from 80% to 99.8%. The apparent density consequently lies, for example, in the range from 0.16 (aerographene) to $$500 \frac{mg}{cm^3},$$

with a typical value of $$100 \frac{mg}{cm^3},$$

whereas the true density lies at 1700 to $$2100 \frac{mg}{cm^3}.$$

The layer of a hydrophobic aerogel does not take the optical form of a reflective interface, or scarcely so that such a layer can protect the overall system including the light-emitting diode chips efficiently from water and contamination without a luminous pattern of the lighting device being adversely influenced. In particular, creation of a halo is avoided. In particular, pixel enlargement is avoided.

The individual elements of the lighting device are efficiently protected by the layer of aerogel. In particular, these further elements are protected both from particles and external mechanical loads. The protection from particles extends in particular up to a particle size predetermined by the aerogel. Depending on the material used for the layer of aerogel, protection from particles of different sizes can be obtained.

The hydrophobic surface of the layer of hydrophobic aerogel facing away from the carrier advantageously allows a water-repellent and consequently almost self-cleaning effect to be attained or achieved.

The layer of hydrophobic aerogel may advantageously protect all of the further elements of the lighting device or, in another example, only parts thereof, for example, only individual light-emitting diode chips and/or partial regions of the carrier. In particular, in one example, the layer of hydrophobic aerogel protects a mechanically sensitive black covering layer so that, according to one example, such a layer can be provided without any risk of mechanical damage to this covering layer being able to occur. The black covering layer is arranged between the light-emitting diode chips on the carrier. According to one element, the carrier is a blackened carrier, therefore has in particular a blackened surface.

In addition, the lighting device may comprise further components, for example, lenses protected by the layer of hydrophobic aerogel efficiently from external mechanical loads. For example, the layer of aerogel protects these components in the course of a hogbrush test for video wall modules.

As described above, a layer of aerogel also offers advantages in applications in the stage lighting area.

This is so because, in stage lighting systems, protection of the individual light-emitting diode chips is usually required, but such protection should as far as possible not comprise any absorption and reflection. The layer described above of hydrophobic aerogel brings about such efficient protection.

Although our devices, modules and transmitters have been more specifically illustrated and described in detail by the preferred examples, this disclosure is not restricted by the examples disclosed, and other variations may be derived from them by one skilled in the art without departing from the scope of protection of the appended claims.

This application claims priority of DE 10 2016 109 050.6, the subject matter of which is incorporated herein by reference.

The invention claimed is:

1. An optoelectronic lighting device comprising:
   a carrier,
   a plurality of light-emitting optoelectronic components arranged on an upper side of the carrier, and
   at least one layer of a hydrophobic aerogel that protects the plurality of light-emitting optoelectronic components from influences of moisture,
   wherein the aerogel of the at least one layer of aerogel is a solid of which up to 99.98% of the volume is formed by pores, a maximum pore size being smaller than 420 nm.

2. A video wall module comprising the optoelectronic lighting device according to claim 1.

3. A signal transmitter for a light signaling installation, comprising the optoelectronic lighting device according to claim 1.

4. The optoelectronic lighting device according to claim 1, wherein the at least one layer of aerogel is at least partially arranged directly on the plurality of light-emitting optoelectronic components.

5. The optoelectronic lighting device according to claim 1, wherein the at least one layer of aerogel is at least partially spaced apart from the plurality of light-emitting optoelectronic components.

6. The optoelectronic lighting device according to claim 1, wherein the at least one layer of aerogel is at least partially spaced apart from the plurality of light-emitting optoelectronic components, and at least one spacer projects above the plurality of light-emitting optoelectronic components and on which the at least one layer of aerogel lies is arranged on the upper side of the carrier.

7. The optoelectronic lighting device according to claim 1, wherein a refractive index of the at least one layer of aerogel is smaller than or smaller than or equal to 1.1.

8. The optoelectronic lighting device according to claim 1, wherein the at least one layer of aerogel has a transmission of at least 90% for a wavelength of electromagnetic radiation emitted by means of the plurality of light-emitting optoelectronic components.

9. The optoelectronic lighting device according to claim 1, further comprising a black covering layer arranged on the upper side of the carrier between the plurality of light-emitting optoelectronic components.

10. The optoelectronic lighting device to claim 1, further comprising a black covering layer arranged on the upper side of the carrier between the plurality of light-emitting optoelectronic components, the black covering layer being protected from influences of moisture by the at least one layer of aerogel.

11. The optoelectronic lighting device according to claim 1, wherein the at least one layer of aerogel is configured as an outermost covering layer for the plurality of light-emitting optoelectronic components.

12. The optoelectronic lighting device according to claim 1, wherein the at least one layer of aerogel provides for liquid drops to efficiently roll off from a surface of the at least one layer of aerogel.

13. The optoelectronic lighting device according to claim 1, wherein the aerogel of the at least one layer of aerogel comprises a dendritic structure comprising a branching of particle chains with a plurality of interspaces in the form of open pores, the particle chains having contact points so that the particle chains form a stable, sponge-like network, the particle size being 380 nm to 420 nm or the particle size being smaller than 400 nm.

14. An optoelectronic lighting device comprising:
a carrier,
a plurality of light-emitting optoelectronic components arranged on an upper side of the carrier, and
at least one layer of a hydrophobic aerogel that protects the plurality of light-emitting optoelectronic components from influences of moisture,
wherein the aerogel of the at least one layer of aerogel comprises a dendritic structure comprising a branching of particle chains with a plurality of interspaces in the form of open pores, the particle chains having contact points so that the particle chains form a stable, sponge-like network, the particle size being 380 nm to 420 nm or the particle size being smaller than 400 nm.

15. A video wall module comprising the optoelectronic lighting device according to claim 14.

16. A signal transmitter for a light signaling installation, comprising the optoelectronic lighting device according to claim 14.

17. The optoelectronic lighting device according to claim 14, wherein the at least one layer of aerogel is at least partially arranged directly on the plurality of light-emitting optoelectronic components.

18. The optoelectronic lighting device according to claim 14, wherein the at least one layer of aerogel is at least partially spaced apart from the plurality of light-emitting optoelectronic components.

19. The optoelectronic lighting device according to claim 14, wherein the at least one layer of aerogel is at least partially spaced apart from the plurality of light-emitting optoelectronic components, and at least one spacer projects above the plurality of light-emitting optoelectronic components and on which the at least one layer of aerogel lies is arranged on the upper side of the carrier.

20. The optoelectronic lighting device according to claim 14, wherein a refractive index of the at least one layer of aerogel is smaller than or smaller than or equal to 1.1.

* * * * *